United States Patent [19]  [11] Patent Number: 5,027,418
Ikegaya et al.  [45] Date of Patent: Jun. 25, 1991

[54] ELECTRO-OPTICAL INSPECTION APPARATUS FOR PRINTED-CIRCUIT BOARDS WITH COMPONENTS MOUNTED THEREON

[75] Inventors: Kazutoshi Ikegaya, Sagamihara; Yuji Maruyama, Tokyo; Kunjo Sannomiya, Atsugi; Yukifumi Tsuda, Kawasaki; Hiroto Toba, Yokohama, all of Japan

[73] Assignee: Matsushita Electric Industrial Co., Ltd., Japan

[21] Appl. No.: 478,339

[22] Filed: Feb. 12, 1990

[30] Foreign Application Priority Data

Feb. 13, 1989 [JP] Japan .................................. 1-33040
Feb. 13, 1989 [JP] Japan .................................. 1-33041

[51] Int. Cl.$^5$ ............................................. G06K 9/52
[52] U.S. Cl. ........................................ 382/8; 382/18; 382/51; 358/101; 250/562
[58] Field of Search ................. 382/8, 32, 18, 50, 51, 382/30; 358/101, 107, 106; 250/562, 563, 565

[56] References Cited

U.S. PATENT DOCUMENTS

| 4,632,546 | 12/1986 | Sick et al. | 250/562 |
| 4,642,813 | 2/1987 | Wilder | 382/8 |
| 4,677,473 | 6/1987 | Okamoto et al. | 358/101 |
| 4,740,708 | 4/1988 | Batchelder | 250/563 |
| 4,823,394 | 4/1989 | Berkin et al. | 382/8 |
| 4,926,452 | 5/1990 | Baker et al. | 382/8 |

Primary Examiner—David K. Moore
Assistant Examiner—Yon Jung
Attorney, Agent, or Firm—Lowe, Price, LeBlanc, Becker & Shur

[57] ABSTRACT

A printed-circuit board inspection apparatus for checking the condition of each circuit component mounted by soldering on a printed-circuit board is disclosed in which a luminance signal obtained from the reflected light scattering from the printed-circuit board being illuminated is converted through a given threshold level to binary signals, then the binary signals and mask data are processed to calculate the ratio of an area represented by the number of binary "1" signals to an area represented by the number of binary "0" signals, and the soldering condition of the component is judged based on the area ratio. With this arrangement, the inspection is not negatively influenced by the misalignment of the component with a mating soldering land, is capable of judging the amount of solder, and can be performed automatically and efficiently. The binary signals may be converted into code data by assigning a code "1" or "0" to each of a plurality of split masks set on each soldering land, depending on the largeness of the area in which the number of binary "1" signals "1" is larger than the number of binary "0" signals or vice versa. In this case, the judgment of the soldering condition is made by comparing the code data with code patterns contained in a predetermined code table.

10 Claims, 11 Drawing Sheets

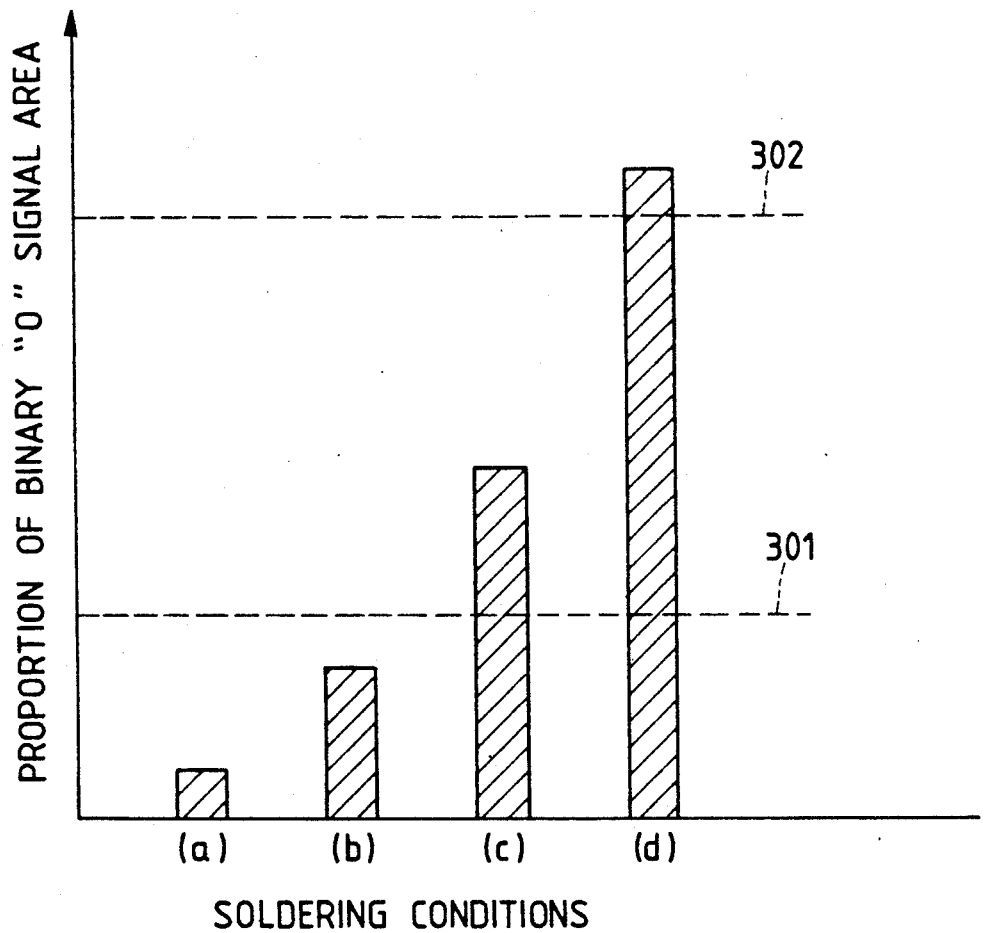

NON-DEFECTIVE

COMPONENT BODY ←

NON-DEFECTIVE (MISALIGNED)

INSUFFICIENT SOLDER

EXCESS SOLDER

MISALIGNED

UNSOLDERED

ELECTRO-OPTICAL INSPECTION APPARATUS FOR PRINTED-CIRCUIT BOARDS WITH COMPONENTS MOUNTED THEREON

BACKGROUND OF THE INVENTION

The present invention relates to an electro-optical apparatus for inspecting a printed-circuit board with circuit components or units mounted thereon to determine whether each component is properly soldered on the printed-circuit board.

Inspection of the presence of a fault such as misalignment, detachment, or floating of any circuit component mounted to soldering on a printed-circuit board is conventionally performed by human eyes. Advanced compacting and weight-reducing technologies rapidly promote the tendency toward a highly dense mounting of compact circuit components on a printed-circuit board. Under these circumstances, it is almost practically impossible to perform a visual inspection of the densely mounted small components for a long period of time without making errors such as the fatigue-induced errors made by human inspectors. Accordingly, there has been a need for automatic inspection systems. One such automatic inspection system proposed heretofore is disclosed in U.S. Pat. No. 4,642,813. The disclosed system is so constructed as to inspect the positional displacement or misalignment of components by using two-dimensional images of the respective components.

Since the automatic inspection system thus constructed uses two-dimensional information on an image of each component recorded by a video camera, it is difficult to detect such a fault occurring when a component as a whole or a lead of an IC device is soldered onto a printed-circuit board in floating condition.

SUMMARY OF THE INVENTION

With the foregoing drawbacks of the prior art in view, it is an object of the present invention to provide an electro-optical, printed-circuit board inspection apparatus capable of inspecting the soldering quality of circuit components efficiently without being influenced by the misalignment of each component or the irregular amount of solder.

In brief, an electro-optical, printed-circuit board inspection apparatus of the present invention is so constructed as to first digitize a luminance signal to binary signals by using a given threshold level, and then judge the soldering quality of each component based on the ratio of an area represented by the number of binary "1" signals to an area represented by the number of binary "0" signals within a mask set on a land to which a portion of each component is to be soldered.

According to a first aspect of the present invention, there is provided an apparatus for inspecting a printed-circuit board with circuit components mounted thereon by soldering at least a portion of each component to a land on the printed-circuit board, comprising: (a) a light source for illuminating each component from a normal direction of the printed-circuit board; (b) image pickup means for taking up an optical image of the printed-circuit board from the normal direction and converting the optical image into a luminance signal; (c) digitizing means for converting the luminance signal into binary signals by comparison with a given threshold level; (d) mask storage means for storing mask data having a given size and predetermined to set a mask on the position of a land on a surface of the printed-circuit board to which a portion of each component is to be soldered; and (e) judgment processing means for calculating the ratio of an area represented by the number of signals of binary "1" in the mask to an area represented by the number of signals of binary "0" in the mask based on the binary signals received from the digitizing means and the mask data received from the mask storage means, and judging the soldering quality of the component based on the area ratio.

According to a embodiment particularly suitable for use with a circuit component having two portions to be soldered to mating lands on the printed-circuit board, the mask is set on the position of each of the two lands, and the judgement processing means is operative to calculate the area ratio based on the sum of an area represented by the number of binary "1" signals in the mask on the position of one of the lands and an area represented by the number of binary "1" signals in the mask on the position of the other land, and the sum of an area represented by the number of binary "0" signals in the mask on the position of one land and an area represented by the number of binary "0" signals in the mask on the position of the other land.

According to a preferred embodiment of the invention, the apparatus further includes conveyor means for moving the printed-circuit board in a direction and a laser apparatus for generating a laser beam. The image pickup means comprises a laser beam scanner including a rotating polygon mirror and a $f\theta$ lens for scanning with the laser beam the surface of the printed-circuit board while being moved, and luminance energy detection means including a condenser lens and a light detection means for collecting rays of reflected light, which are scattered off the surface of the printed-circuit board and then reflected back via the $f\theta$ lens and the polygon mirror, and outputting the luminance signal from the light detection means.

According to a further preferred embodiment, the image pickup means further includes an additional luminance energy detection means disposed in symmetrical relation to the first-mentioned luminance energy detection means about a scanning plane of the laser beam for producing an additional luminance signal, and an adder for adding the first-mentioned luminance signal and the additional luminance signal and delivering an output equal to their sum. As an alternative, the apparatus may include an additional luminance energy detection means disposed in symmetrical relation to the first-mentioned luminance energy detection means about a scanning plane of the laser beam for producing an additional luminance signal, an additional digitizing means for converting the additional luminance signal into binary signals, and a mixer for mixing the binary signals received from the first-mentioned digitizing means and the binary signals received from the additional digitizing means.

According to a second aspect of the present invention, there is provided an apparatus for inspecting a printed-circuit board with circuit components mounted thereon by soldering at least a portion of each component to a land on the printed-circuit board, comprising: (a) a light source for illuminating each component from a normal direction of the printed-circuit board; (b) image pickup means for taking up an optical image of the printed-circuit board from the normal direction and converting the optical image into a luminance signal; (c) digitizing means for converting the luminance signal into binary signals by comparison with a given threshold level; (d) mask storage means for storing mask data to set a plurality of split mask on the position of a land on a surface of the printed-circuit board to which a portion of each component is to be soldered; (e) code conversion means receiving the binary signals from the digitizing means and the mask data from the mask storage means for assigning a code "1" to each of the split masks when an area represented by the number of binary "1" signals is larger than an area represented by the number of binary "0" signals, and a code "0" to each of the split masks when an area represented by the number of binary "0" signals is larger than an area represented by the number of binary "1" signals, and outputting code data of binary digits corresponding to coded conditions of the respective split masks; and (f) judgment means for comparing the code data received from the code conversion means with a code table containing a plurality of predetermined code patterns representing non-defective products or defective products to thereby judge the soldering quality of the component.

When used with a circuit component having a plurality of portions to be soldered to mating lands on the printed-circuit board, the split masks are provided on the position of each of the lands, and the judgment means is operative to compare a plurality of sets of code data assigned to the respective ones of the split masks, as a single unit of code data, with code patterns contained in the code table.

The above and other objects, features and advantages of the present invention will become more apparent from the following description when making reference to the detailed description and the accompanying sheets of drawings in which preferred structural embodiments incorporating the principles of the present invention are shown by way of illustrative example.

BRIEF DESCRIPTION OF THE DRAWINGS

FIG. 3 is a bar chart showing the correlation between the proportion of a binary "0" signal area and various soldering conditions;

DETAILED DESCRIPTION OF THE PREFERRED EMBODIMENT

Figure 1:
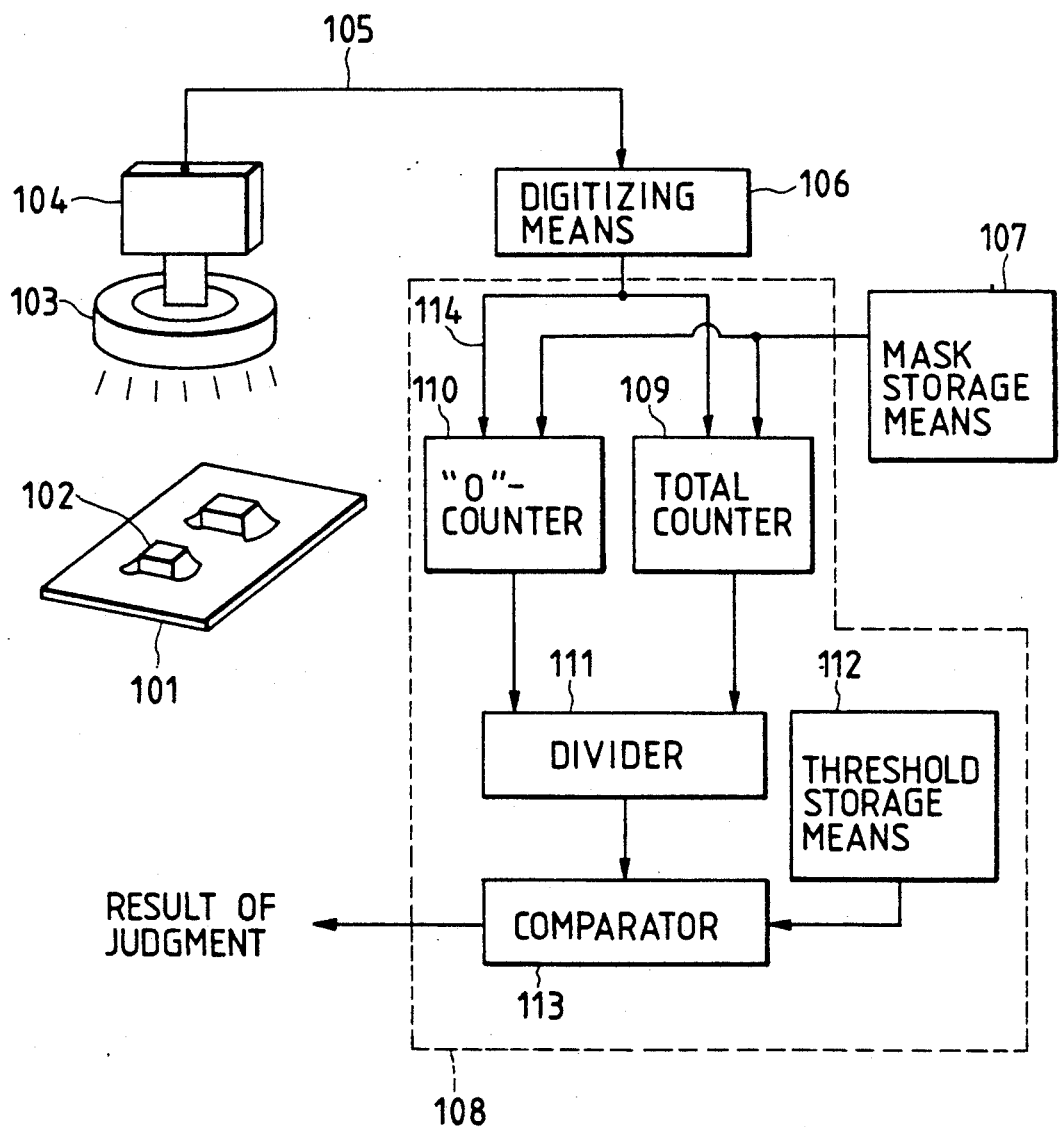
FIG. 1 is a partly pictorial block diagram showing the general construction of a printed-circuit board inspection apparatus according to a first embodiment of the present invention.

Certain preferred embodiments of the present invention will be described hereinbelow in greater detail with reference to the accompanying drawings, in which like reference characters designate like or corresponding parts throughout the several views.

FIG. 1 shows a printed-circuit board inspection apparatus according to a first embodiment of the present invention. The inspection apparatus generally comprises a light source 103 for illuminating circuit components or units 102 mounted by soldering on a printed-circuit board 101, an image pickup means 104 such as a camera with a charge-coupled device (CCD) for picking up an optical image of each component 102 on the printed-circuit board 101 and converting the optical image to a luminance signal 105, a digitizing means or digitizer 106 for converting the luminance signal 105 into binary signals, a mask storage means 107 for storing a mask which is used for a making operation described below, and a judgment processing means 108. The judgment processing means 108 includes a total counter 109 for calculating a total area within the mask represented by the number of groups of binary "1" and binary "0" signals, a "0" (zero) counter 110 for calculating an area within the mask represented by the number of binary "0" signals, a divider 111 for calculating the ratio of an area represented by the binary "1" signals to the area represented by binary "0" signals, a threshold storage means 112 for storing at least one threshold level used for judging the soldering quality of each component 102, and a comparator 113 for comparing the result of calculation by the divider 111 and the threshold from the threshold storage means 112. 114 designates a binary signal supplied from the digitizing means 106 to the respective counters 109, 110.

The printed-circuit board inspection apparatus of the foregoing construction operates as follows.

The light source 103 such as a ring illuminator illuminates each component 102 mounted on the printed-circuit board 101 from the normal direction of the printed-circuit board 101 while at the same time, the image pickup means comprising the CCD camera 104 takes up an optical image of the component 102 from the normal direction of the printed-circuit board 101 and converting the thus obtained optical image to a luminance signal 105. The luminance signal 105 is supplied to the digitizing means 106 in which the luminance signal 105 is compared with an arbitrarily given threshold level and changed to a digital signal having a binary "1" or a binary "0". The mask storage means 107 stores mask data regarding a mask having a arbitrarily give size and predetermined for the masking of each land formed on a surface of the printed-circuit board 101 on which a portion of each component 102 is to be soldered. The binary signal derived from the digitizing means 106 and the master data received from the mask storage means 107 are then supplied to the judgment processing means 108 which in turn calculates the ratio of an area in the mask represented by the number of binary "1" signals and an area represented by the number of binary "0" signals and then judges the soldering quality of the component 102 depending on the thus calculated area ratio. Stated more specifically, according to the mask data from the mask storage means 107, all the binary signals received within the mask is counted by the total counter 109, while the "0"-counter 110 counts only the number of binary "0" signals within the mask. Then the divider 113 calculates the ratio of the output from the total counter 109 to the output from the "0"-counter 110 and outputs a signal representing the total-to-"0" area ratio. The area ratio signal is compared with the threshold level stored in the threshold storage means 112 for judgment of the quality of a soldered portion on the printed-circuit board 101.

Figure 2A:
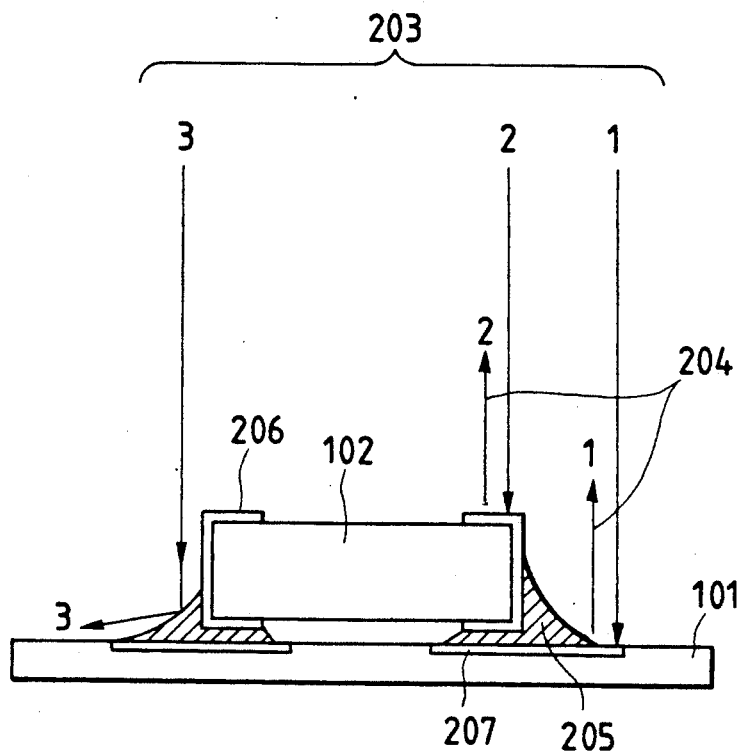
FIGS. 2(A) and 2(B) are diagrammatical views illustrating the manner in which the soldering quality is judged according to the inspection apparatus shown in FIG. 1.
Figure 2B:
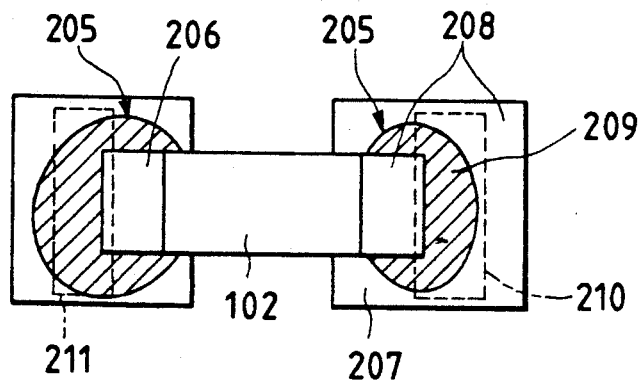

The soldering quality judgment is achieved in the manner described below with reference to FIGS. 2(A), 2(B) and 3. As shown in FIG. 2(A), light rays 203-1, 203-2, 203-3 irradiated by the light source such as the ring illuminator are reflected by a component 102 and soldered portions or fillets 205 indicated by hatching. The reflected light 204 is collected by photoelectric cells in the CCD camera 104 (FIG. 1) positioned in a normal direction (upward direction in FIG. 2(A)) of the printed-circuit board 101, then is converted into luminance signals.

The soldered portion 205, electrode portions 206 of the component 101 and lands 207 of the printed-circuit board 101 have extremely smooth surfaces (so-called "mirror surfaces") which reflect an incident ray specularly so that a reflected ray is in the same plane as the incident ray. Incident rays 203-1-203-3 of irradiated light are directed against the lands 207, electrode portions 206 and solder fillets 205, respectively and returns therefrom as reflected rays 204-1, 204-2, 204-3. In this instance, since the electrode portions 205 and the lands 207 are flat, the corresponding reflected rays 204-1, 204-2 reach to the photoelectric cells and converted into intensive luminance signals. On the other hand, the solder fillets 205 have curved surfaces so that the incident rays 203 specularly reflected from the solder fillet 205 and the reflected ray 204-3 does not return to the photoelectric cell. In terms of intensity of the luminance signals, the flat electrode portions 206 and the flat lands 207 constitute light portions 208 while the curved solder fillets 205 constitute dark portions 209, as shown in FIG. 2(B).

In view of the foregoing distinctive features of the luminance signals obtained in the vicinity of the soldered portions, two mask 210, 211 having an arbitrarily given size are preset with respect to the respective lands 207. Within each mask 210, 211, a comparison is made between an area of the light portion 208 and an area of the dark portion 210 represented respectively by a group of binary "1" signals and a group of binary "0" signals which are obtained by digitizing the individual luminance signals at an arbitrarily given threshold level. Depending on the result of the comparision, a judgment of the quality of the soldered portion is made.

In the case where the judgement of the soldering quality is made based on the ratio of the dark portion represented by the binary "0" signals to the total area of the mask, a proportion of the dark portion (binary "0" signal area) and a first threshold level designated at 301 in FIG. 3 are compared. In other words, when the component 102 is unsoldered as indicated by a bar (a) in FIG. 3, or when the component 102 is insufficiently soldered as indicated by a bar (b) in FIG. 3, this means that the formation of the solder fillet 205 is insufficient. Accordingly, the proportion of the dark area within the mask does not exceeds the threshold level 301. When the soldering quality judgment requires recognition between a properly soldered condition indicated by a bar (c) in FIG. 3 and an excessively soldered condition (i.e., an extremely large dark area) indicated by a bar (d) in FIG. 3, a second threshold level 302 higher than the first threshold level 301 is provided.

According to the foregoing embodiment, the combination of the light source 103 and the image pickup means 104 accurately reflects the light-reflecting performance characteristics of the soldered portions, thus obviating the need for a complicated setting of the illuminating conditions. Furthermore, since a mask is set on each land 210, 211 provided for the soldering purpose, and since the judgment is made depending on a relative comparision performed within the mask between a binary "0" signal area and a binary "1" signal area, the judgment is not influenced by the amount of solder, the shape of the soldered portion and the size of the individual component. Accordingly, a highly reliable judgment can be obtained.

Figure 4:
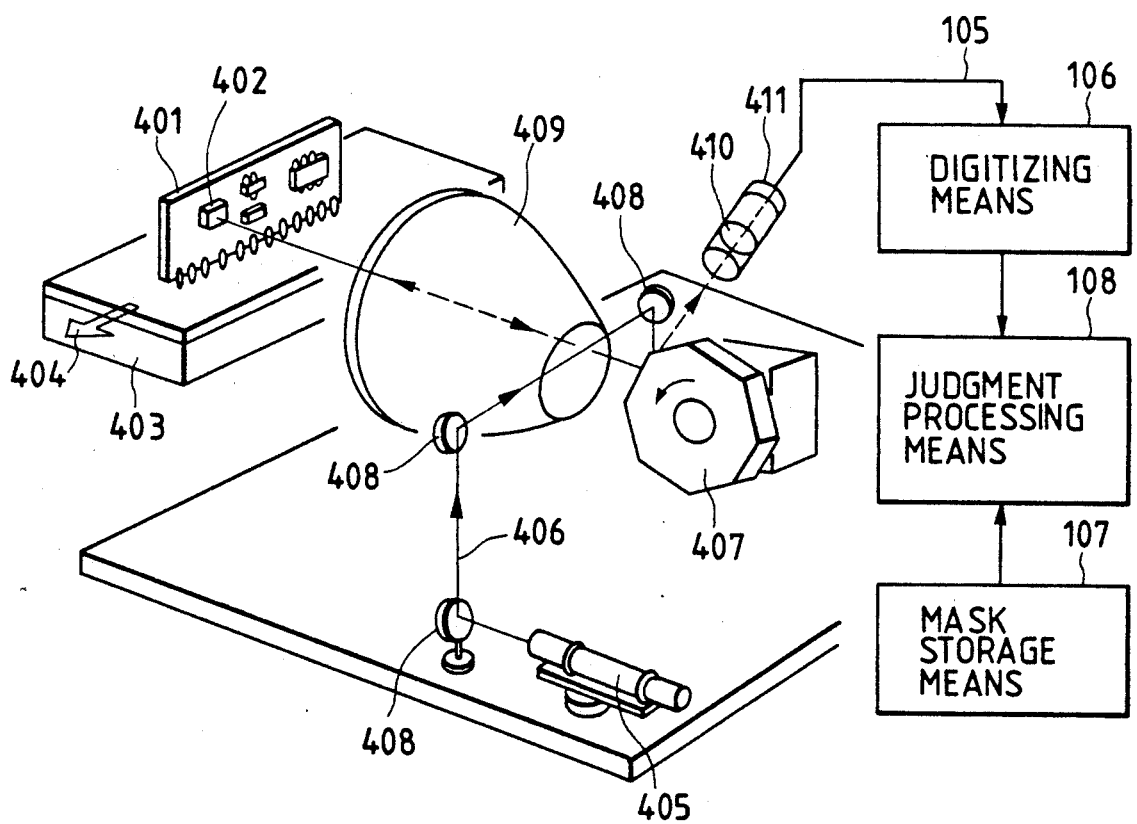
FIG. 4 is a partly pictorial block diagram showing the general construction of a printed-circuit board inspection apparatus according to a second embodiment of the present invention.

FIG. 4 shows a printed-circuit board inspection apparatus according to a second embodiment of the present invention. This inspection apparatus differs from the inspection apparatus of the foregoing embodiment shown in FIG. 1 in that a laser beam scanner is provided for obtaining luminance signals in place of the combination of the light source and the image pickup means.

The inspection apparatus includes a conveyor means 403 for moving a printed-circuit board 401 with components 402 mounted thereon, in a direction indicated by the arrow 404. The laser beam scanner comprises a laser apparatus 405 for producing a laser beam 406, a continuously rotating polygon mirror 407, a set of mirrors 408 properly arranged to direct the laser beam 406 to the polygon mirror 407, and a f$\theta$ lens 409. The inspection apparatus further includes a luminous energy detection means composed of a condenser lens 410 and a light detection element 411. Reference character 105 denotes a luminance signal supplied from the light detection element 411, 106 a digitizing means, 107 a mask storage means, and 108 a judgment processing means. These components 106–108 are substantially the same as those described with reference to the first embodiment shown in FIG. 1 and accordingly a further description is no longer necessary.

The printed-circuit board inspection apparatus of the foregoing construction operates as follows.

While the printed-circuit board 401 with the components 402 mounted thereon is being transferred in the direction of the arrow 404 by means of the conveyor means 403, the laser beam 406 from the laser apparatus 405 is directed by the mirrors 408 onto the polygon mirror 407 being rotated. Then the polygon mirror 407 and the f$\theta$ lens 409 directs the laser beam 406 perpendicularly onto the moving printed-circuit board 401. Thus, the laser beam 406 two-dimensionally scans over the entire surface of the printed-circuit board 401.

With this scanning with the laser beam 406, the scattered light returning from the printed-circuit board 401 is collected via the f$\theta$ lens 409 and the polygon mirror 407 and further through the condenser lens 410 to the light detecting element 411 which comprises a photoelectric cell and outputs a luminance signal 105.

Subsequent steps of operation are the same as those described with the first embodiment shown in FIG. 1 and will be described only in a brief manner. The luminance signal 105 is converted into binary signals by means of the digitizing means 106. Then the binary signals and the mask data stored in the mask storage means 107 are supplied to the judgment processing means 108 which calculates the ratio of an area represented by the binary "1" signals to an area represented by the binary "0" signals and then judges the soldering condition based on the thus calculated area ratio.

As appears clear from the foregoing description, the second embodiment, as against the first embodiment shown in FIG. 1, employs a luminance signal generating means which is composed of the laser apparatus 405, the polygon mirror 407, the fθ lens 409, the condenser lens 410 and the light detecting element 411. Since the laser beam 406 is projected perpendicularly over the entire surface of the printed-circuit board 401, it is possible to negate a loss caused by uneven illumination of the printed-circuit board 401. Furthermore, by properly setting the rotational speed (number of revolutions) of the polygon mirror 407, the diameter of the laser beam 406 and the transfer speed of the conveyor means 403, the resolution power of the luminance signal can be enhanced more easily than obtained by using the CCD camera as in the first embodiment shown in FIG. 1. Thus, a more accurate inspection of the soldered portions is possible to obtain.

Figure 5:
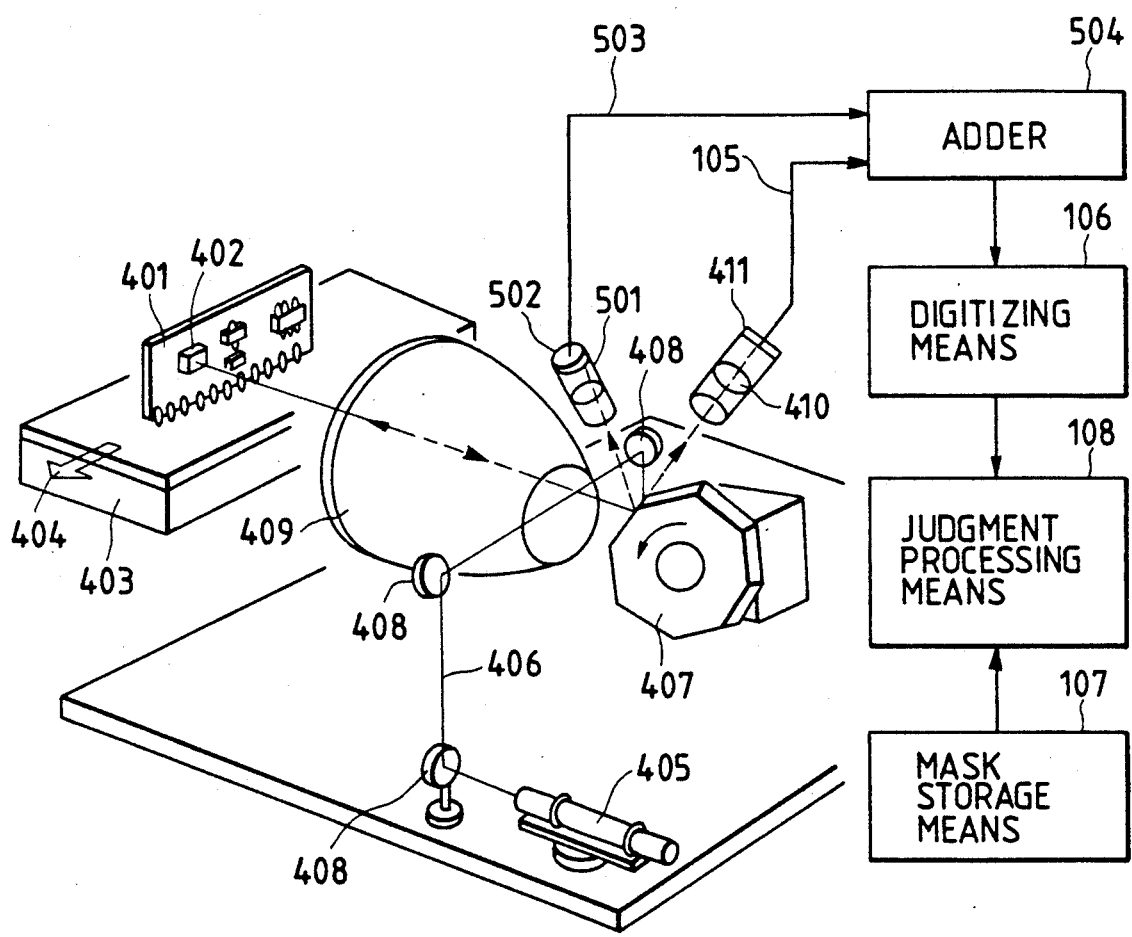
FIG. 5 is a view similar to FIG. 4, but showing a modified printed-circuit board inspection apparatus according to a third embodiment of the present invention.

FIG. 5 shows a printed-circuit board inspection apparatus according to a third embodiment of the present invention. This inspection apparatus is substantially the same as the inspection apparatus of the second embodiment shown in FIG. 4 with the exception that two luminance energy detection means each composed of a condenser lens 411, 501 and a light detecting element 411, 502 are disposed symmetrically about the scanning plane of the laser beam, and that an analog adder 504 is connected with the two luminance energy detection means for adding the respective luminance signals 105, 503 and for delivering an output equal to their sum to the digitizing means 106.

The printed-circuit board inspection apparatus of the foregoing construction will operate as follows.

A laser beam 406 guided by the polygon mirror 407 and the fθ lens 407 projects perpendicularly onto the printed-circuit board 401 while being moved by the conveyor means 403, thereby scanning the entire surface of the printed-circuit board 401.

As a result of this scanning with the laser beam 406, reflected light scattered off the printed-circuit board 401 is guided to two sets of the condenser lens 410, 505 and light detection elements 411, 502 that are disposed in symmetrical relation to one another about the scanning plane of the laser beam 406. The light detection elements 411, 502 output respective luminance signals which in turn are added by the analog adder 504. Then the analog adder 504 delivers an output signal to the digitizing means 106 by means of which the output signal is converted into binary signals. The binary signals and the mask data stored in the mask storage means 107 are supplied to the judgment processing means 108 in which the ratio of an area in the mask represented by binary "1" signals to an area in the mask represented by binary "0" signals is calculated and, based on the thus calculated area ratio, a judgment on the soldering quality is performed.

An advantageous features attained by the provision of the foregoing two luminance energy detection means 410 and 411, 501 and 502 and the analog adder 504 will be described below with reference to FIGS. 6(A) and 6(B).

Figure 6A:
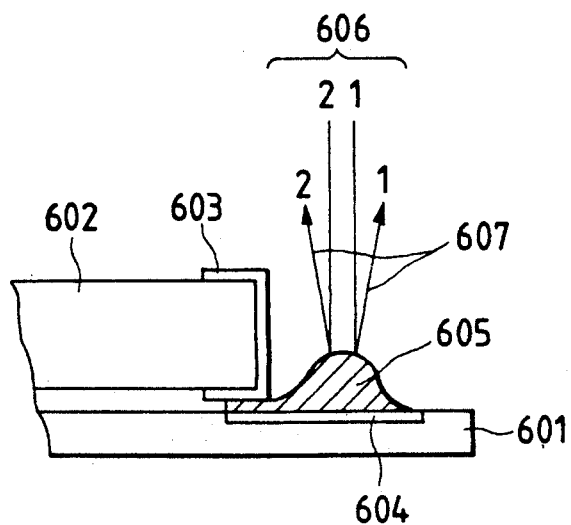
FIGS. 6(A) and 6(B) are diagrammatical views showing a soldering failure caused by misalignment between a soldering head and a component lead.
Figure 6B:
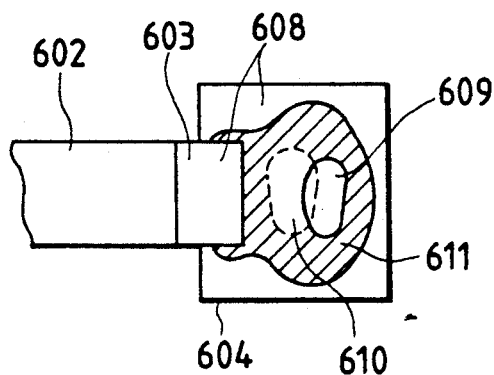

FIGS. 6(A) and 6(B) schematically illustrate a defective soldering which is caused by some reasons such as the positional displacement or misalignment of a component 602 relative to a printed-circuit board 601. In these figures, 603 denotes and electrode portion of the component 602, 604 a soldering land on a surface of the printed-circuit board 601, 605 a poorly soldered portion, 606 an incident laser beam, and 607 rays of reflected light. As shown in FIG. 6(A), rays 606-1, 606-2 of incident light projected respectively on the poorly soldered portion 604 are scattered off in different directions as rays 607-1, 607-2 of the reflected light 607. As shown in FIG. 6(B), in terms of the intensity of a luminance signal derived from one luminance energy detection means, the electrode portion 603 and the land 604 jointly constitute a light portion 608 and a portion of the soldered portion 605 defined by a solid line represents another light portion 609 while the rest of the soldered portion 605 constitutes a dark portion 611 indicated by hatching. On the other hand, in terms of the intensity of a luminance signal derived from the other luminance energy detection means, the electrode portion 603 and the land 604 jointly constitute a light portion 608 and a portion of the soldered portion 605 defined by a broken line represents another light portion 610 while the rest of the soldered portion 605 constitutes a dark portion 611 indicated by hatching. With this arrangement, a poorly soldered portion 605 such as shown in FIG. 6(A) can readily be detected with increased accuracy because a defective soldering can be represented by a larger light portion by adding the respective luminance signals delivered from the two luminance energy detection means.

According to the third embodiment described above, two luminance energy detection means are disposed in symmetrical relation to one another about the scanning plane of the laser beam. Luminance signals derived from the respective luminance energy detection means are added by the analog adder so as to enhance the light-reflective characteristics of the poorly soldered portion. Consequently, the accuracy of the soldering quality judgment is improved.

Figure 7:
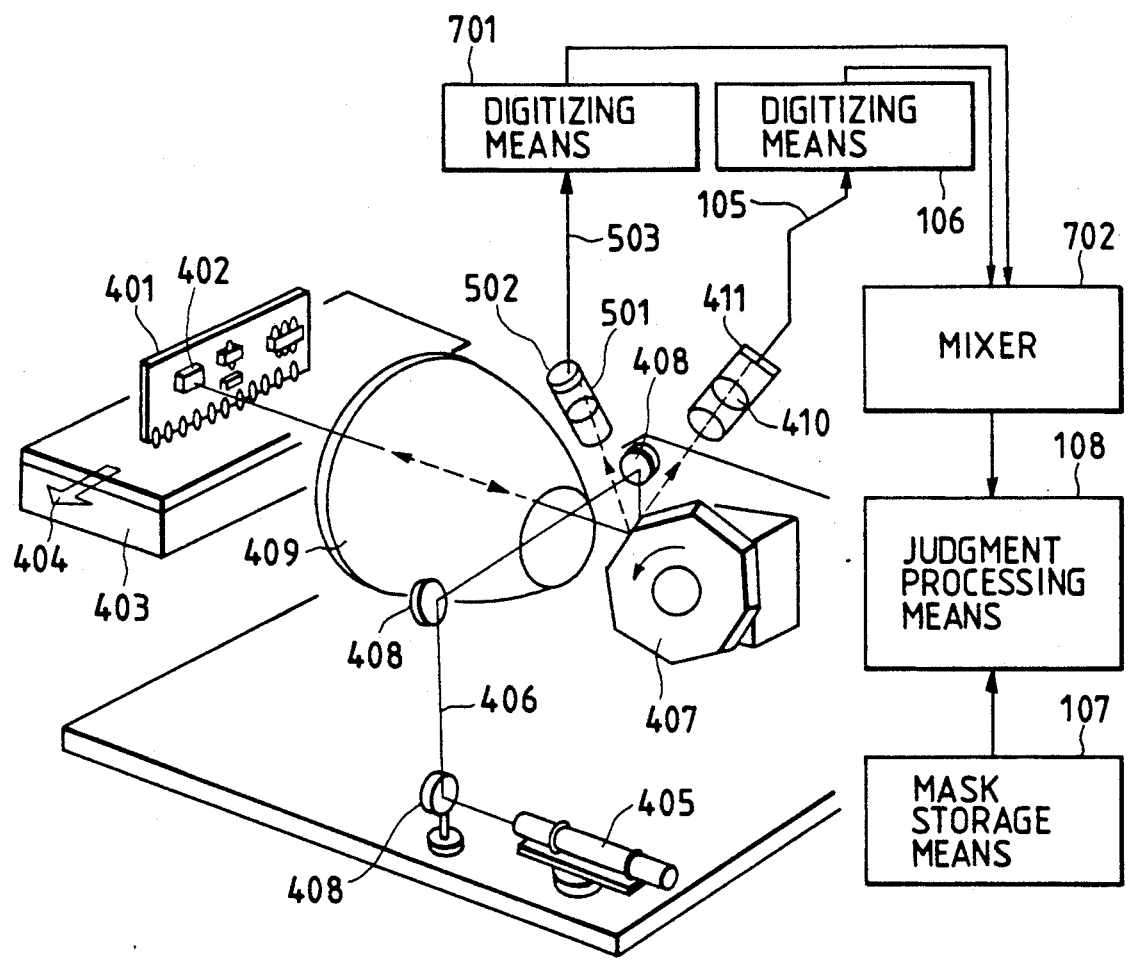
FIG. 7 is a view similar to FIG. 5, but showing a printed-circuit board inspection apparatus according to a fourth embodiment of the present invention.

FIG. 7 shows a printed-circuit board inspection apparatus according to a fourth embodiment of the present invention. The inspection apparatus is the same as the inspection apparatus shown in FIG. 5 except for the following structural features. Two luminance signals derived from the respective luminance energy detecting means are digitized by two digitizing means 106, 701. Then the binary signals are mixed up by a mixing means or mixer 702 such as a logic OR circuit. The modified inspection apparatus has a same advantageous effect as the inspection apparatus shown in FIG. 5.

Figure 8:
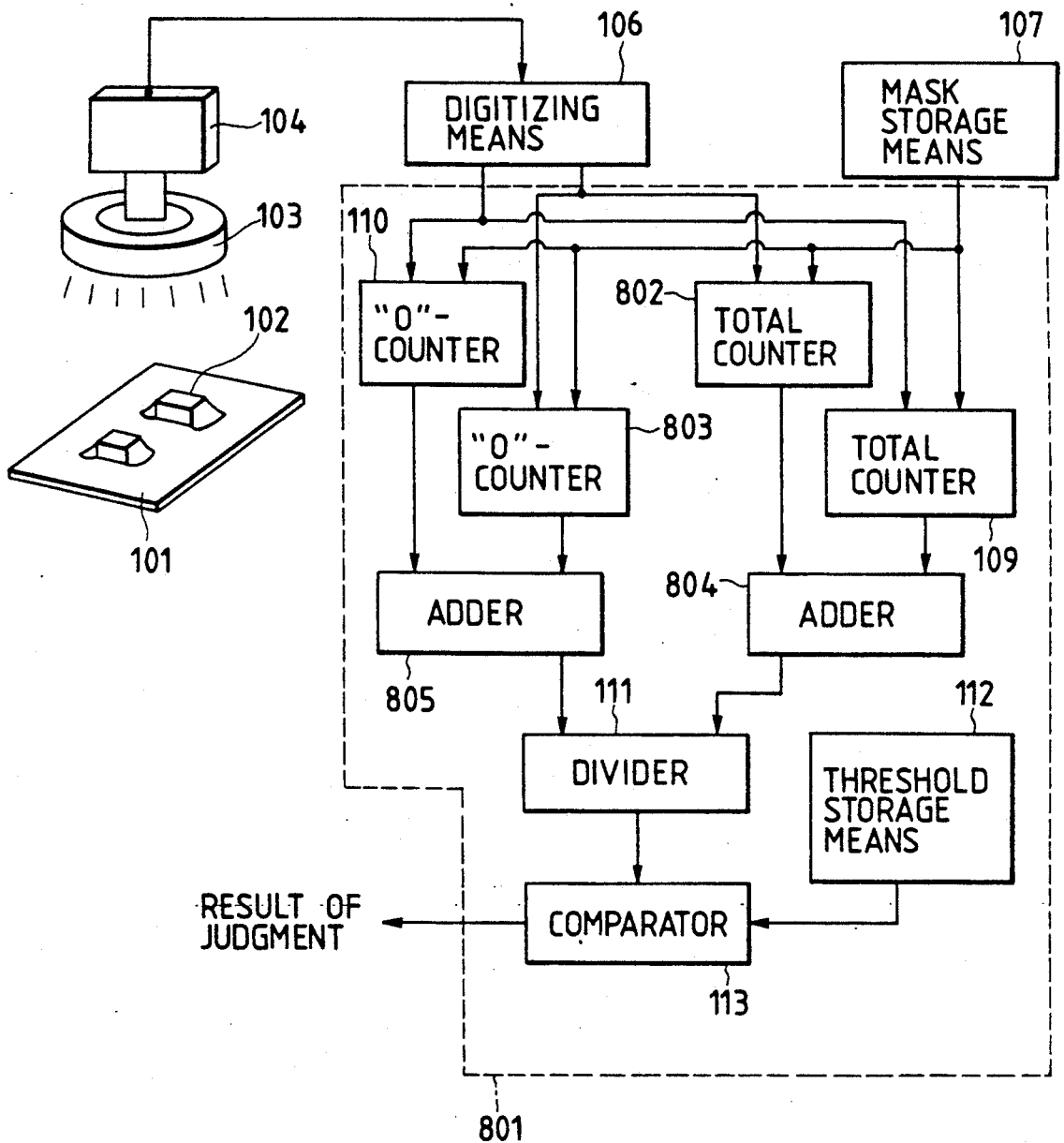
FIG. 8 is a view similar to FIG. 1, but showing a modified printed-circuit board inspection apparatus according to fifth embodiment of the present invention.

FIG. 8 illustrates a printed-circuit board inspection apparatus according to a fifth embodiment which is a modification of the first embodiment described above with reference to FIGS. 1, 2(A) and 2(B). The modified inspection apparatus is particularly advantageous when used with a component having two electrode portions or terminals to be soldered to the corresponding lands on the printed-circuit board. For instance, the component 102 shown in FIGS. 2(A) and 2(B) has two soldered portions 205 at opposite ends thereof. The soldered portions 205 are located substantially at central portions of the corresponding lands 107 as shown in FIG. 2(B). If the electrode portions 206 of the component 102 were out of alignment with the corresponding lands 207 on the printed-circuit board 101, a defective soldering would result. However, such defective soldering is difficult to detect in the case of the inspection apparatus shown in FIG. 1 because a judgment of the soldering condition is achieved depending on the light-to-dark area ratio calculated only in connection with right or left soldered portion. In order to overcome the foregoing difficulty, the inspection apparatus shown in FIG. 8 includes a modified judgment processing means 801 so constructed as to take the light-to-dark area ratio in each of the two masks 210, 211 (FIG. 2(B)) into consideration. To this end, the judgment processing means 801 includes an additional pair of total and "0" counters 802, 803 provided parallel to the first pair of total and "0" counters 109, 110, and two adders 804, 805 one of which is provided for a pair of total counters 109, 802, the other for a pair of "0" counters 110, 803. The adders 804, 805 are connected to a divider 111 which serves to calculate the dark-to-light area ratio of the two soldered portions. With this arrangement, the judgement can be made with accuracy even when terminals of the component are misaligned with the mating lands on a printed-circuit board.

Figure 9:
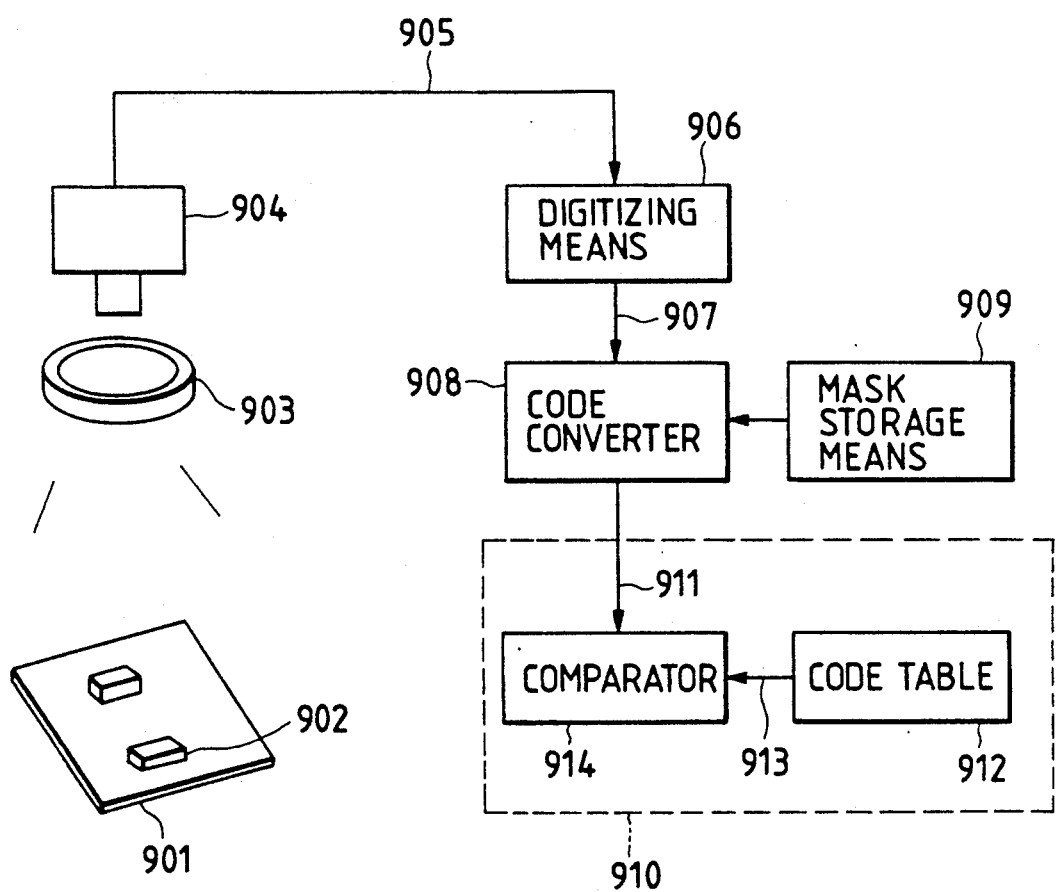
FIG. 9 is a partly pictorial block diagram showing the general construction of a printed-circuit board inspection apparatus according to a sixth embodiment of the present invention.

FIG. 9 shows a printed-circuit board inspection apparatus according to a sixth embodiment of the present invention.

The inspection apparatus generally comprises a light source 903 for illuminating components 902 mounted by soldering on a printed-circuit board 901, an image pickup means 904 such as a CCD camera for picking up an optical image of each component 902 and converting the optical image to a luminance signal 905, a digitizing means 906 for converting the luminance signal 905 to binary signals 907. a mask storage means 909 for storing a mask used for a masking operation, a code converter 908 for converting the binary signals 907 into code data according to mask data stored in the mask storage means 909, and a judgment means 910 for making a judgment based on a comparsion between the code data received from the code converter 908 with a prescribed code table 912.

The printed-circuit board inspection apparatus of the foregoing construction operates as follows.

The light source 903 such as a ring illuminator illuminates each component 902 mounted on the printed-circuit board 901 while at the same time, the image pickup means comprising the CCD camera 904 takes up an optical image of the component 902 and converts the optical image to a luminance signal 905. The luminance signal 905 is supplied to the digitizing means 906 in which the luminance signal 905 is compared with an arbitrarily given threshold level and coverted to digital signals 907. Then the code converter 908 first obtains an area represented either by the number of binary "1" signals or by the number of binary "0" signals in each of the split mask data which is stored in the mask storage means 909 in connection with a corresponding one of the split land portions, then assigns a code "1" or "0" to the split mask depending on the largeness of the areas thus obtained, and finally converts the binary signals 907 into code data 911 in conformity with the coded conditions of the respective split masks. The judgment means 910 includes a comparator 914 for comparing the code data 911 with code patterns 913 received from the predetermined code table 912. In the case where the code data 911 coincides with a code pattern representing a non-defective soldered portion, the soldered portion of the component being inspected is judged as being non-defective. On the other hand, when a coincidence is not established between the code data 911 and the code pattren 913, or alternatively when the code data 911 coincides with a code pattern representing a defective soldered portion, then the soldered portion of the component being inspected is judged as being defective.

Figure 10A:
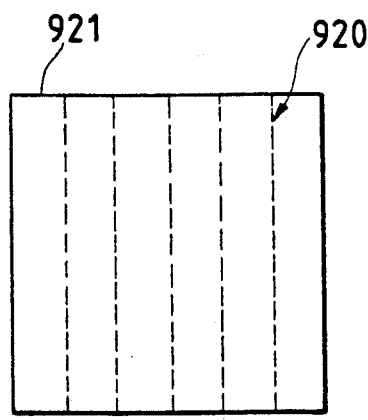
FIG. 10(A) is an enlarged plan view of a mask used in the inspection apparatus shown in FIG. 9.
Figure 10B:
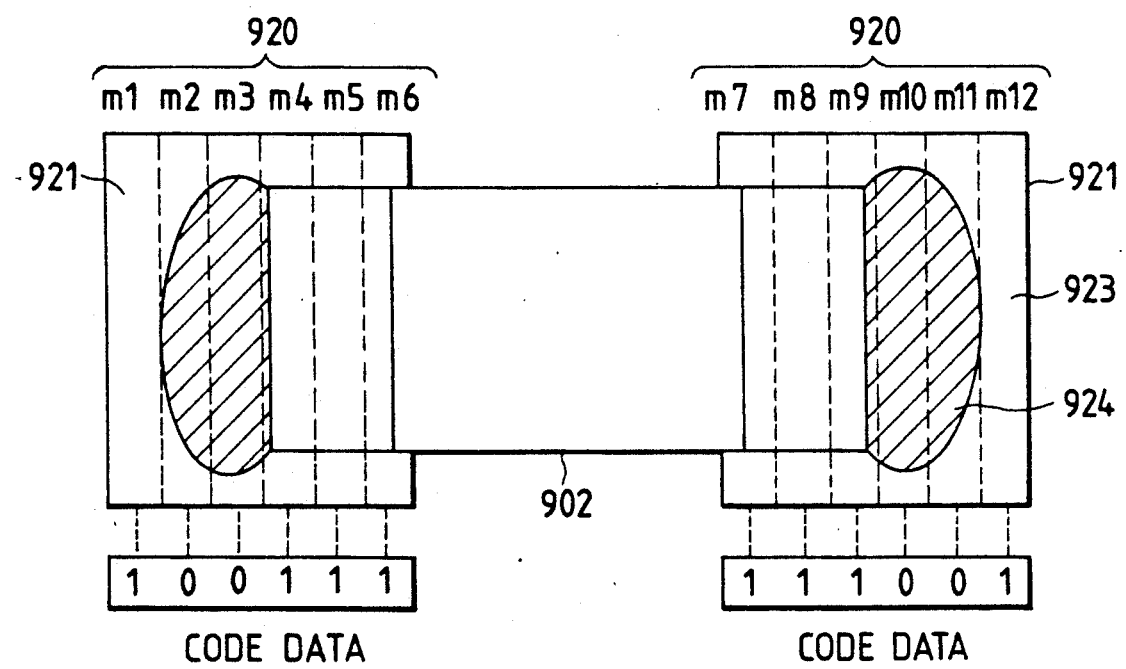
FIG. 10(B) is a diagrammatical plan view showing the manner in which the mask shown in FIG. 10(A) is used for obtaining coded data.

The foregoing coding operation and the shape of the split mask used therein will be described below with reference to FIGS. 10(A) and 10(B). As shown in FIG. 10(A), a mask 920 is identical in shape to the shape of a land 921 to which a lead or electrode portion of the component is soldered. The mask 920 is split into a row of identical split mask portions m1 through m6 or m7 through 12 as shown in FIG. 10(B). Each mask portion is coded as "1" or "0" depending on the proportion of a light portion 923 to a dark portion 924 (indicated by hatching) in each of the split mask portions. In the embodiment shown in FIG. 10(B), the row of split mask portions m1 through m6 is assigned a code data string "100111" while the row of split mask portions m7 through m12 is assigned a code data string "111001".

Figure 11A:
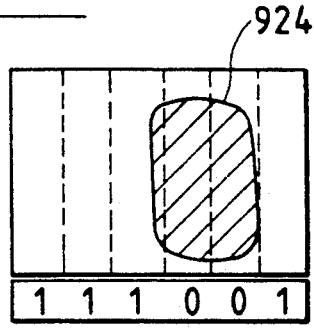
FIGS. 11(A) through 11(F) are diagrammatical views showing various soldering conditions recognized depending on the relative position between the mask and a soldered portion.
Figure 11B:
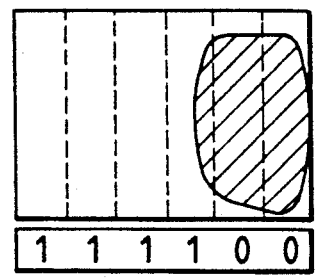
Figure 11C:
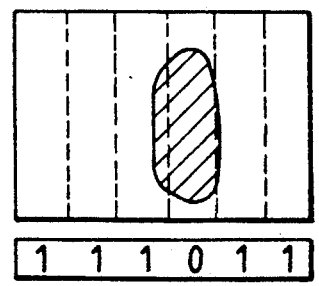
Figure 11D:
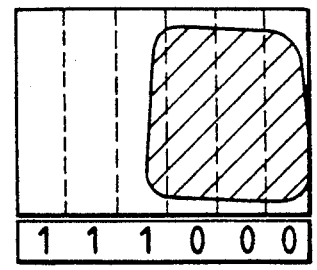
Figure 11E:
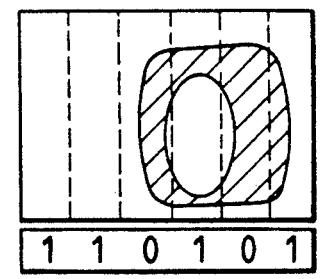
Figure 11F:
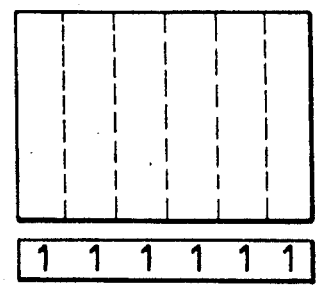

FIGS. 11(A) through 11(F) are diagrammatical representations of various soldering conditions and corresponding code data strings. FIG. 11(A) shows a non-defective soldering condition. FIG. 11(B) illustrates another non-defective soldering condition in which a soldered portion is slightly displaced in a lateral direction with respect to the soldered portion shown in FIG. 11(A). FIG. 11(C) exemplifies a representative defective soldering condition caused due to insufficient solder. Another defective soldering condition shown in FIG. 11(D) is caused by an excess amount of solder. FIG. 11(E) also illustrates another defective soldering condition as the electrode portion of a component is unsoldered due to misalignment of the component with respect to the land. The soldering condition shown in FIG. 11(F) is defective because the land is entirely unsoldered.

Then, a seventh embodiment of the present invention will be described below with reference to FIG. 10(B). As shown in FIG. 10(B), the soldered portions are located substantially centrally of the corresponding lands 921. In the case where the component is laterally displaced or misaligned with respect to the lands 921, a correct judgment of the soldering quality may not be obtain only by using the code data on either left or right soldered portion. In this instance, the code data on the left side soldered portion and the code data one the right side soldered portion are handled as a single unit of code data and compared with a code pattern in the code table. With this arrangement, the judgment of the soldering condition can be made with accuracy even when opposite terminal or electrode portions of the component are misaligned with the mating lands on a printed-circuit board.

Obviously various minor changes and modifications of the present invention are possible in the light of the above teaching. For instance, the laser beam scanning device as shown in FIGS. 4, 5 and 7 may be used in the inspection apparatus shown in FIG. 9 in place of the luminance signal pickup system. It is therefore to be understood that within the scope of the appended claimes the invention may be practiced otherwise than as specifically described.

What is claimed is:

1. An apparatus for inspecting a printed-circuit board with circuit components mounted thereon by soldering at least a portion of each component to a land on the printed-circuit board, wherein the circuit component has two portions to be soldered to mating lands on the printed-circuit board, comprising:

(a) a light source for illuminating each component from a normal direction of the printed-circuit board;
    (b) image pickup means for taking up an optical image of the printed-circuit board from said normal direction and converting the optical image into a luminance signal;
    (c) digitizing means for coverting said luminance signal into binary signals by comparison with a given threshold level;
    (d) mask storage means for storing mask data having a given size and predetermined to set a mask on the position of a land on a surface of the printed-circuit board to which a portion of each component is to be soldered; and
    (e) judgment processing means for calculating the ratio of an area represented by the number of signals of binary "1" in said mask to an area represented by the number of signals of binary "0" in said mask based on said binary signals received from said digitizing means and said mask data received from said mask storage means, and judging the soldering quality of the component based on said area ratio,
    wherein said mask is set on the position of each of the two lands, and said judgment processing means is operative to calculate said area ratio based on the sum of an area represented by the number of binary "1" signals in the mask on the position of one of the lands and an area represented by the number of binary "1" signals in the mask on the position of the other land, and the sum of an area represented by the number of binary "0" signals in the mask on the position of said one land and an area represented by the number of binary "0" signals in the mask on the position of said other land.

2. An apparatus according to claim 1, wherein said judgment processing means includes a first total counter operatively connected with said digitizing means and said mask storage means for calculating a total area represented by said binary "1" signals and said binary "0" signals in the mask on the position of said one land, a first "0" counter operatively connected with said digitizing means and said mask storage means for calculating said area represented by said binary "0" signals in the mask on the position of said one land, a second total counter operatively connected with said digitizing means and said mask storage means for calculating a total area represented by said binary "1" signals and said binary "0" signals in the mask on the position of said other land, a second "0" counter operatively connected with said digitizing means and said mask storage means for calculating said area represented by said binary "0" signals in the mask on the position of said other land, a first adder for adding said areas calculated by said first and second total counters, a second adder for adding said areas calculated by said first and second "0" counters, a divider operatively connected with said first and second adders for calculating the ratio of an area represented by said binary "1" signals in both masks to an area represented by said binary "0" signals in both masks, a threshold storage means for storing at least one threshold level used for said judgment of the soldering quality, and a comparator operatively connected with said divider and said threshold storing means for comparing the result of calculation by said divider and said threshold level received from said threshold storage means.

3. An apparatus, for inspecting a printed-circuit board with circuit components mounted thereon by soldering at least a portion of each component to a land on the printed-circuit board, comprising:

(a) a light source for illuminating each component from a normal direction of the printed-circuit board;
    (b) image pickup means for taking up an optical image of the printed-circuit board from said normal direction and converting the optical image into a luminance signal;
    (c) digitizing means for converting said luminance signal into binary signals by comparison with a given threshold level;
    (d) mask storage means for storing mask data having a given size and predetermined to set a mask on the position of a land on a surface of the printed-circuit board to which a portion of each component is to be soldered; and
    (e) judgment processing means for calculating the ratio of an area represented by the number of signal of binary "1" in said mask to an area represented by the number of signals of binary "0" in said mask based on said binary signals received from said digitizing means and said mask data received from said mask storage means, and judging the soldering quality of the component based on said area ratio,
    further including conveyor means for moving the printed-circuit board in a direction, said light source comprising a laser apparatus for generating a laser beam, said image pickup means comprising a laser beam scanner including a rotating polygon mirror and a fθ lens for scanning with said laser beam the surface of the printed-circuit board while being moved, and luminance energy detection means including a condenser lens and a light detection means for collecting rays of reflected light, which are scattered off the surface of the printed-circuit board and then reflected back via said fθ lens and said polygon mirror, and outputting said luminance signal from said light detection means.

4. An apparatus according to claim 3, wherein said image pickup means further includes an additional luminance energy detection means disposed in symmetrical relation to the first-mentioned luminance energy detection means about a scanning plane of said laser beam for producing an additional luminance signal, and an adder for adding the first-mentioned luminance signal and said additional luminance signal and delivering an output equal to their sum.

5. An apparatus according to claim 3, further including an additional luminance energy detection means disposed in symmetrical relation to the first-mentioned luminance energy detection means about a scanning plane of said laser beam for producing an additional luminance signal, an additional digitizing means for converting said additional luminance signal into binary signals, and a mixer for mixing said binary signals received from the first-mentioned digitizing means and said binary signals received from said additional digitizing means.

6. An apparatus for inspecting a printed-circuit board with circuit components mounted thereon by soldering at least a portion of each component to a land on the printed-circuit board, comprising:
(a) a light source for illustrating each component from a normal direction of the printed-circuit board;
(b) image pickup means for taking up an optical image of the printed-circuit board from said normal direction and converting the optical image into a luminance signal;
(c) digitizing means for converting said luminance signal into binary signals by comparison with a given threshold level;
(d) mask storage means for storing mask data to set a plurality of split masks on the position of a land on a surface of the printed-circuit board to which a portion of each component is to be soldered;
(e) code conversion means receiving said binary signals from said digitizing means and said mask data from said mask storage means for assigning a code "1" to each of said split masks when an area represented by the number of binary "1" signals is larger than an area represented by the number of binary "0" signals, and a code "0" to each of said split masks when an area represented by the number of binary "0" signals is larger than an area represented by the number of binary "1" signals, and outputting code data of binary digits corresponding to coded conditions of the respective split masks; and
(f) judgment means for comparing said code data received from said code conversion means with a code table containing a plurality of predetermined code patterns representing non-defective products or detective products to thereby judge the soldering quality of the component.

7. An apparatus according to claim 6, for use with a circuit component having a plurality of portions to be soldered to mating lands on the printed-circuit board, wherein said split masks are provided on the position of each of the lands, and said judgment means is operative to compare a plurality of sets of code data assigned to the respective ones of the split masks, as a signal unit of code data, with code patterns contained in said code table.

8. An apparatus according to claim 6, further including conveyor means for moving the printed-circuit board in a direction, said light source comprising a laser apparatus for generating a laser beam, said image pickup means comprising a laser beam scanner including a rotating polygon mirror and a f$\theta$ lens for scanning with said laser beam the surface of the printed-circuit board while being moved, and luminance energy detection means including a condenser lens and a light detection means for collecting rays of reflected light, which are scattered off the surface of the printed-circuit board and then reflected back via said f$\theta$ lens and said polygon mirror, and outputting said luminance signal from said light detection means.

9. An apparatus according to claim 8, wherein said image pickup means further includes an additional luminance energy detection means disposed in symmetrical relation to the first-mentioned luminance energy detection means about a scanning plane of said laser beam for producing an additional luminance signal, and an adder for adding the first-mentioned luminance signal and said additional luminance signal and delivering an output equal to their sum.

10. An apparatus according to claim 8, further including an additional luminance energy detection means disposed in symmetrical relation to the first-mentioned luminance energy detection means about a scanning plane of said laser beam for producing an additional luminance signal, an additional digitizing means for converting said additional luminance signal into binary signals, and a mixer for mixing said binary signals received from the first-mentioned digitizing means and said binary signals received from said additional digitizing means.

* * * * *

UNITED STATES PATENT AND TRADEMARK OFFICE
CERTIFICATE OF CORRECTION

PATENT NO. : 5,027,418

DATED : June 25, 1991

INVENTOR(S) : Kazutoshi IKEGAYA et al.

It is certified that error appears in the above-identified patent and that said Letters Patent is hereby corrected as shown below:

On the title page, the third inventor's name, change "Kunjo" to --Kunio--.

Signed and Sealed this

Twenty-seventh Day of October, 1992

Attest:

DOUGLAS B. COMER

Attesting Officer     Acting Commissioner of Patents and Trademarks